United States Patent Office 3,432,543
Patented Mar. 11, 1969

3,432,543
REDUCTION OF CHLORINATED BY-PRODUCTS IN ETHYLENE-BASED VINYL ACETATE CATALYST SOLUTION
Jerald Edson Dirks and Gene Jordan Fisher, Corpus Christi, Tex., assignors to Celanese Corporation, New York, N.Y., a corporation of Delaware
No Drawing. Filed May 23, 1966, Ser. No. 551,915
U.S. Cl. 260—497       2 Claims
Int. Cl. C07c 67/04, 69/02

This invention relates to a process for minimizing the formation of chlorinated by-products in a catalyst solution used in the manufacture of alkenyl esters from olefins. More particularly, this invention relates to the process of minimizing the formation of chloroform in a catalyst solution used in the manufacture of vinyl acetate from ethylene.

Recently, a process has been developed for the production of vinyl acetate from ethylene, as distinguished from prior processes for producing vinyl acetate utilizing acetylene, wherein ethylene is contacted with an essentially non-aqueous acetic acid solution comprising a palladium (II) salt, a source of acetate ion and a redox system in the presence of molecular oxygen. Such a process is disclosed, for example, in U.S. patent application Ser. No. 223,535, filed Sept. 13, 1962, by Arthur W. Schnizer et al., which is assigned to Celanese Corporation.

During the production of vinyl acetate by the above process, a portion of oxygen reacts with ethylene to form oxalic acid which in turn reacts with the copper to form copper (II) oxalate. Copper (II) oxalate is insoluble in the reaction solution and must be removed from the vinyl acetate reaction zone to recover the precipitated copper and to remove the oxalate. The removal of the oxalate and recovery of the soluble copper is usually carried out by withdrawing a portion of the precipitated copper (II) oxalate from the vinyl acetate reaction zone, treating it with sufficient hydrochloric acid or other mineral acid in admixture with hydrochloric acid to free the copper from its association with the oxalate, and heating the acidified solution to a temperature sufficient to thermally decompose the oxalic acid. Molecular oxygen is usually introduced into the solution to maintain copper in the solution as copper (II). Copper (II) has been found to catalyze the decomposition of the acetic acid solvent to chlorinated compounds such as monochloroacetic acid, dichloroacetic acid and trichloracetic acid, possibly according to the following reaction sequence:

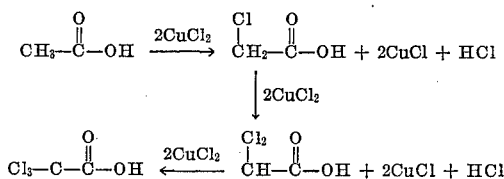

Trichloroacetic acid, when heated decomposes to form chloroform and carbon dioxide. Chloroform is an impurity which is difficult to remove from vinyl acetate and, for commercial use, vinyl acetate must meet rigid specifications as to chloride content.

To reduce the formation of chloroform and other chlorinated byproducts generated during the copper recovery process is one of the objects of this invention.

It has been found that the addition of a compound which is more easily oxidizable than acetic acid introduced into the reaction solution retards the formation of chloroform and chlorinated byproducts. It is desirable that the easily oxidizable compound be one which does not affect the oxidation reaction of ethylene to vinyl acetate nor one which introduces an impurity into the final reaction product which cannot be removed easily and economically. Compounds which have been found to be useful in the process according to this invention include aldehydes having from 2 to 6 carbon atoms, and chloroacetaldehyde. Preferably, acetaldehyde is used. The amount of easily oxidized compound to be introduced into the catalyst solution is dependent on the rate at which the oxidation of acid by copper (II) to chlorinated byproducts proceeds. This amount can be easily determined once the rate is known.

For a better and more complete understanding of the present invention, its objects, and advantages, reference should be had to the following description illustrating the instant process.

Ethylene and oxygen are brought into contact in an appropriate reaction zone with an essentially non-aqueous acetic acid solution comprising a palladium (II) salt, a source of acetate ions, usually introduced as an alkali metal acetate, a source of chloride ions, usually introduced as HCl or copper chloride, and a copper (II) salt redox couple. This process is carried out at a temperature ranging from about 0–200° C. and a pressure ranging from 0 to 1000 p.s.i.g. High yields of vinyl acetate can be obtained by carrying out the reaction such that an ethylene-oxygen mixture is contacted with an essentially acetic acid solution containing from $1 \times 10^{-4}$ to 1 molar palladium (II) ion, 0.02–1.0 molar copper (II) ion, 0.01–1.0 molar chloride ion and 0.5–5.0 molar acetate ion at a temperature of from 100–150° C. and at a pressure of about 300–500 p.s.i.g.

During the above oxidation reaction oxalic acid is formed which reacts with copper (II) in the reaction solution forming insoluble cupric oxalate. To remove the oxalate and recover the copper redox catalyst, a slip stream containing precipitated copper (II) oxalate amounting to about 0.5–4.0 percent per hour of the catalyst volume is removed from the vinyl acetate reaction zone to a regenerator zone where sufficient hydrochloric acid or hydrochloric acid in admixture with another mineral acid is introduced in sufficient quantities to remove the copper from its association in the oxalate. Preferably, 100–150 percent of the amount of acid required to free all the organic salts in the reaction solution is employed. Molecular oxygen is also introduced into the regeneration zone along with or subsequent to the addition of hydrochloric acid in order to maintain a portion of the copper in the solution as copper (II). The acidified slurry, now containing free oxalic acid, is heated to a temperature and pressure sufficient to thermally decompose 70–100% of the oxalic acid. Preferably a temperature ranging from 70–220° for a period of 120 to 10 minutes at a pressure ranging from 100 to 600 p.s.i.g. is used. The pressure needed is only that required to maintain the reactants in the liquid phase.

It is during the heating step of the above reaction that most of the chloroform from the decomposition of trichloroacetic is formed. Prior to this step it is thus necessary to introduce into the regenerator feed solution a compound more easily oxidizable than acetic acid in the presence of copper (II). Specifically, it has been found that an acetaldehyde content of at least about 1% results in a significant decrease in chloroform and chlorinated acetic acid byproducts. Additional acetaldehyde can be added, of course, but it is of no practical advantage. Byproducts of acetaldehyde degradation, such as chloroacetaldehyde and crotonaldehyde are easily removed from the reaction solution and present no problem. The following examples are intended to be illustrative of the instant invention and are not intended to be limiting in any way.

Example I

Several experiments were made oxidizing acetic acid in the regeneration solvent with copper (II). These experiments were carried out in sealed tubes. For these experiments copper (II) was added with varying concentrations of lithium ion, chloride ion and acetate ion to a solvent containing 60 wt. percent acetic acid and 40 wt. percent water. The sealed tubes containing these components were heated at 180° C. for 20 minutes, cooled, and the contents analyzed for chloroform. The results of these experiments are listed in Table I below.

TABLE I

| Run | $CuCl_2$, M | $Cu(OAc)_2$, M | LiCl, M | HCl, M | Reaction temp., °C. | Reaction time, min. | $CHCl_3$, p.p.m. |
|---|---|---|---|---|---|---|---|
| 1 | 0.8 | 0.0 | 0.0 | 0.0 | 179–181 | 20 | 120 |
| 2 | 0.8 | 0.0 | 0.4 | 0.0 | 179–181 | 20 | 130 |
| 3 | 0.8 | 0.0 | 1.0 | 0.0 | 179–181 | 20 | 143 |
| 4 | 0.8 | 0.0 | 0.0 | 0.0 | 179–181 | 20 | 120 |
| 5 | 0.8 | 0.0 | 0.0 | 1.2 | 179–181 | 20 | 160 |
| 6 | 0.8 | 0.0 | 0.0 | 3.0 | 179–181 | 20 | 155 |
| 7 | 0.4 | 0.4 | 0.4 | 0.0 | 179–181 | 20 | 470 |
| 8 | 0.4 | 0.4 | 0.8 | 0.0 | 178–181 | 20 | 310 |
| 9 | 0.8 | 0.0 | 0.0 | 0.8 | 178–181 | 20 | 120 |
| 10 | 0.8 | 0.0 | 0.4 | 0.4 | 178–181 | 20 | 100 |
| 11 | 0.6 | 0.2 | 0.8 | 0.0 | 178–181 | 20 | 520 |

Example II

A series of runs were carried out using varying amounts of acetaldehyde added to the feed compositions from a vinyl acetate reaction zone. The results are shown in Table II. Run No. 5, carried out in the presence of formaldehyde instead of acetaldehyde, demonstrates the ineffectiveness of formaldehyde as a compound to retard or reduce the amount of chlorinated by-products formed in the regeneration operation.

TABLE II

| Runs | 1 | 2 | 3 | 4 |
|---|---|---|---|---|
| Feed composition: | | | | |
| $Cu^{++}$, M | 0.60 | 0.80 | 0.58 | 0.69 |
| $Cl^-$, M | 1.52 | 2.4 | 1.60 | 1.9 |
| $Li^+$, M | 0.47 | 0.60 | 0.56 | 0.6 |
| Pd, mM | | | | |
| Acetaldehyde, wt. percent | 0.55 | 2.50 | 4.1 | |
| Formaldehyde, wt. percent [1] | | | | 1.0 |
| Feed rate, ml./min | 5.7 | 4.8 | 5.3 | 5.3 |
| Residence time, min. [2] | 14.6 | 17.3 | 15.6 | 15.7 |
| Temp. range, °C.: | | | | |
| Preheater outlet | 170 | 170 | 170 | 169 |
| Bottom of reactor | 176 | 178 | 176 | 176 |
| Top of reactor | | 177 | 176 | 176 |
| Gas feed | Air | Air | Air | Air |
| Oxygen feed, mM | | 197 | 90 | 171 |
| Gas out (vent.): | | | | |
| Volume, l | | 2.23 | 1.20 | 1.85 |
| $N_2$, mole percent | | 80.6 | 67.3 | 83.8 |
| $O_2$, mole percent | | 8.1 | 9.6 | 11.4 |
| $CO_2$, mole percent | | 6.8 | 12.7 | 1.8 |
| Reactor product analysis: | | | | |
| $Cu^{++}$, M | 0.19 | 0.05 | 0.05 | 0.30 |
| $Cu^+$, M | 0.20 | 0.35 | 0.21 | 0.18 |
| Total chloride, M | 1.30 | 1.56 | 1.36 | 1.62 |
| Acetaldehyde, wt. percent | 0.28 | 1.6 | 1.7 | |
| Chloroacetic acid, M | 0.08 | 0.008 | 0.03 | 0.21 |
| Chloroform, p.p.m. | 25 | 7 | 1 | 105 |

[1] Added as 37 wt. percent Formalin.
[2] Defined as reactor volume (83 ml.) divided by feed rate.

Example III

Similar runs to those carried out in Example II were made using a feed composition containing varying amounts of oxalic acid. The results are shown in Table III.

TABLE III

| Run | 1 | 2 |
|---|---|---|
| Feed composition: | | |
| $Cu^{++}$, M | 0.90 | 0.50 |
| $Cl^-$, M | 2.10 | 1.33 |
| $Li^+$, M | 0.60 | 0.12 |
| Acetaldehyde, wt. percent | 2.30 | 2.00 |
| Oxalic acid, M | 0.84 | 0.79 |
| Feed rate, ml./min | 5.0 | 5.3 |
| Residence time, min.[1] | 16.6 | 15.6 |
| Temperature, °C.: | | |
| Reactor bottom | 167 | 170 |
| Reactor | 166 | 165 |
| Gas Feed, $O_2$, feed, mmoles | 780 | |
| Gas Out, volume, l | 11.2 | |
| $N_2$, mol percent | 67.8 | |
| $O_2$, mol percent | 9.5 | |
| $CO_2$, mol percent | 17.6 | |
| Reactor product analysis: | | |
| $Cu^{++}$, M | 0.11 | 0.10 |
| $Cu^+$, M | 0.39 | 0.27 |
| Total chloride, M | 2.38 | 0.03 |
| Chloroacetic acid, M | 0.026 | 0.03 |
| Chloroform, p.p.m. | 1 | <1 |
| Acetaldehyde, wt. percent | 0.6 | 1.0 |
| Oxalate, M | 0.11 | 0.22 |
| Oxalate destroyed, percent | 81.8 | 72 |

[1] Defined as reactor volume (83 ml.) divided by feed rate.

The embodiments of the invention in which an exclusive property or privilege is claimed are defined as follows:

1. In the process for the removal of copper (II) oxalate formed in the manufacture of vinyl acetate by the reaction of ethylene with acetic acid in the presence of a noble metal of Group VIII of the Periodic Table and a copper (II) salt wherein a portion of the catalyst solution containing copper (II) oxalate is treated with hydrochloric acid to free oxalic acid from at least a portion of the copper (II) oxalate and the oxalic acid is thermally decomposed by heating to a temperature ranging from about 170–220° C. for a period of 120–10 minutes, the improvement which comprises reducing the formation of chlorinated by-products formed during the copper-oxalate treatment by the oxidation of acetic acid by copper (II) by adding to said portion of the catalyst solution a compound more easily oxidizable by copper (II) than acetic acid selected from the group consisting of aldehydes of 2–6 carbon atoms.

2. Process according to claim 1 wherein the easily oxidizable compound is acetaldehyde added in an amount ranging from 1 to 4 weight percent based on the catalyst solution.

References Cited

UNITED STATES PATENTS 3,346,626  10/1967  Schaeffer et al. _____ 260—497

LORRAINE A. WEINBERGER, *Primary Examiner.*

VIVIAN GARNER, *Assistant Examiner.*